Figure 1:
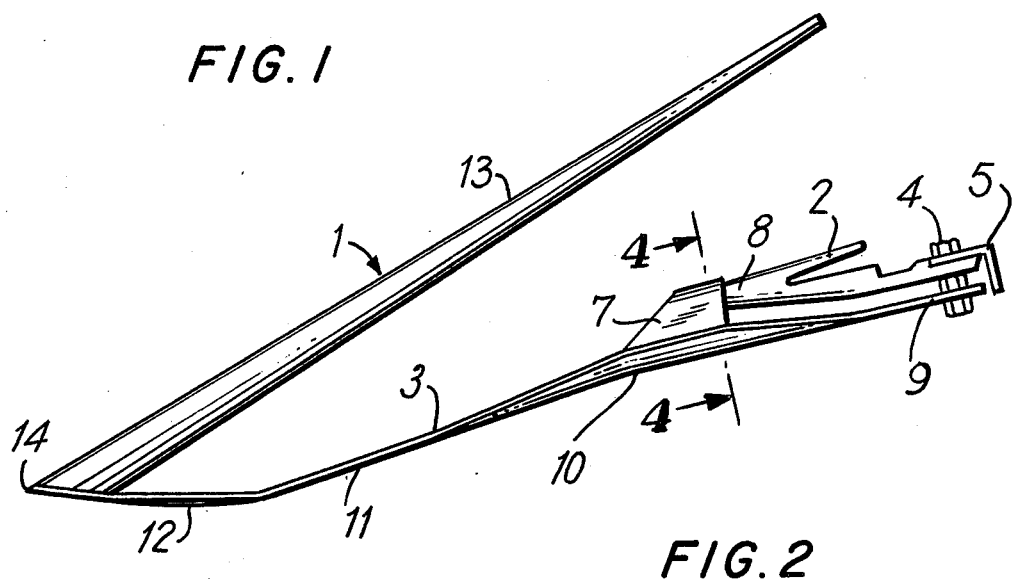

United States Patent [19]

Schumacher, II et al.

[11] 4,120,138

[45] Oct. 17, 1978

[54] GRAIN LIFTER FOR THE CUTTER MECHANISMS OF HARVESTERS

[76] Inventors: Gustav Schumacher, II; Gunter Schumacher, both of 5231 Eichelhardt Westerwald, Fed. Rep. of Germany

[21] Appl. No.: 704,024

[22] Filed: Jul. 8, 1976

[30] Foreign Application Priority Data

Jul. 14, 1975 [DE] Fed. Rep. of Germany ....... 2531435

[51] Int. Cl.² ............................................ A01D 55/10
[52] U.S. Cl. ..................................................... 56/313
[58] Field of Search .................................. 56/312, 313

[56] References Cited

U.S. PATENT DOCUMENTS

| | | | |
|---|---|---|---|
| 791,022 | 5/1905 | Gaterman | 56/313 |
| 1,250,251 | 12/1917 | Wadleigh | 56/313 |
| 3,742,690 | 7/1973 | Schumacher et al. | 56/313 |
| 3,834,139 | 9/1974 | Schumacher et al. | 56/313 |

*Primary Examiner*—Russell R. Kinsey
*Attorney, Agent, or Firm*—Steinberg & Blake

[57] ABSTRACT

The invention relates to a grain lifter for the cutter mechanisms of harvesters having a support leg of solid flat material which carries on one of the ends thereof the stalk lifting bar and at the other end thereof is secured, by means of a holder embracing the mower finger tip, to the mower finger and to the mower finger holder, wherein said support leg is stiffened by having a non-linear cross-section within the part of the support leg which is fixed to the holder which embraces the mower finger tip.

8 Claims, 5 Drawing Figures

U.S. Patent    Oct. 17, 1978    4,120,138

GRAIN LIFTER FOR THE CUTTER MECHANISMS OF HARVESTERS

The invention relates to a grain lifter for the cutter mechanisms of harvesters. Grain lifters of this kind have already been known in most various embodiments. As a rule, they include a supporting leg of solid flat material which carries, at the front end pointing in its direction of motion, the stalk lifting bar and is secured, at its rear end, by means of a holder embracing the mower finger tip, to the mower finger and the mower finger holder. Various shapes have been provided for the supporting leg. It can be subdivided into three sections: first the front section to which, upwardly and backwardly sloping at an acute angle, the stalk lifting bar is secured and which constitutes the so-called gliding section which in the harvesting process glides over the ground. Adjacent thereto, there is the middle section which may be formed in various shapes, slightly sloping to the back in order to level out the height difference between the gliding section in the front and the fastening section in the last third. In this last section, the fastening elements are provided with the aid of which the supporting leg is fastened to the mower finger, or to the mower finger support.

It has already been known to provide the front section, which glides over the ground, with a configuration such that this section is stabilized and obtains better gliding characteristics on the ground. In German Pat. No. 1,188,853, a grain lifter including a supporting leg has been described wherein the middle section has been stiffened by a suitable cross-section in the longitudinal direction. In German Pat. No. 594,586, a grain lifter has been described the whole supporting leg of which has a groove shaped configuration.

These prior art embodiments however show various substantial disadvantages which are to be seen in that, in the grain lifter according to German Pat. No. 1,188,853, the real fastening portion of the supporting leg to the mower finger is not stabilized while in the grain lifter according to German Pat. No. 594,586 the whole supporting leg is so profiled that it no longer has any elastic properties.

By performing numerous practical tests, it has been found that optimum results can be obtained if the supporting leg shifts the lifting forces of the ground-parallel gliding section as far to the rear as possible so that the change of the setting angle in case of an upward stroke of the grain lifter, for instance when running, with its gliding section, over a ground rise, bulge, or wave, will not become too great. The stresses on the stalk lifting bar, on the other hand, should be absorbed in the foremost portion in order to avoid that the stalk lifting bar breaks off and that the harvest be treated as carefully as possible. The section to which the holder which embraces the mower finger is fastened should furthermore be as stable as possible as it is just in this place that the greatest forces arise when the grain lifter in the course of rough operation in the field moves upwardly or downwardly.

It is therefore an aim of the present invention to provide a grain lifter for the cutter mechanisms of harvesters which includes the properties shown above to be optimal and which therefore advantageously differs from the prior art embodiments of grain lifters.

This problem is solved in accordance with the invention in that a grain lifter for the cutter mechanisms of harvesters has a support leg of solid flat material which carries at one of the ends thereof the stalk lifting bar and at the other end thereof is secured, by means of a holder embracing the mower guard finger tip, to the mower finger and the mower guard finger holder. This support leg is stiffened by having a substantially rigid portion within the section of the support leg connected to the holder embracing said mower guard finger tip.

Upon this section, which can be termed the third portion of the support leg length, seen from the foremost tip, the greatest forces become effective in the vertical as well as in the lateral direction. In the prior art structures, fissures were therefore very often experienced. Furthermore, resilient properties are not desired in this section.

Stiffening of this "third portion", i.e. of the section around the holder embracing the mower guard finger tip, can be performed in various ways, for instance by providing longitudinal stiffening corrugations.

It has proved to be particularly useful to provide a portion in the longitudinal direction having the shape of a channel open on top and tapering off to the front as well as to the rear, i.e. passing over into the flat springy, yieldable cross section again. This channel-shaped portion open on the top shows the additional advantage that the holder which embraces the mower finger and which for instance can be shaped like a loop need be secured in the channel by one welding seam only as the bent-up channel side edges constitute an additional support and fixation for this guard finger loop.

As the welding of such hard materials involves some problems because of the decarbonization experienced when heating for instance spring steel, through which the material becomes brittle, there is a further advantage in that in order to secure the guard finger loop, the single welding seam necessary can be provided in the middle of the channel. That means that the tension forces on the support leg experienced when pressing the stalk lifter tip downwardly are absorbed by the bent-up flanks of the channel and when bending up, on the other hand, the outer radius of the channel will absorb these forces.

In accordance with a further advantageous embodiment of the present invention, the support leg is provided with a channel portion open toward the ground in the section connected to the holder embracing the mower guard finger tip.

Such an embodiment proves particularly advantageous in the case of a riveted joint of the holder which embraces the mower guard finger tip and imparts, to the support leg in this section, the necessary stiffness while the problems involved with welding are not experienced.

Adjacent to this rigid portion of the support leg in the section of the holder which embraces the mower finger tip, there is the rear section which is flat and in which the lifting forces acting on the gliding section on the front are absorbed.

In the front, in the direction of motion, there is also a flat section which resiliently absorbs the forces emanating from the rigid stalk lifting bar in order to avoid, in the first place, a breaking of the stalk lifting bar, and to guarantee, by the resilient possibilities of the stalk lifting bar, on the other hand, a careful handling of the harvest.

The front portion, that is the gliding section of the grain lifter, can, in accordance with a particularly advantageous embodiment of the present invention, be provided again with a suitable cross section in order to yield optimum gliding properties on the ground.

This cross section is suitably provided with upwardly bent edges, which facilitates lateral movement of the grain lifter over the ground, particularly when turning.

Figure 2:
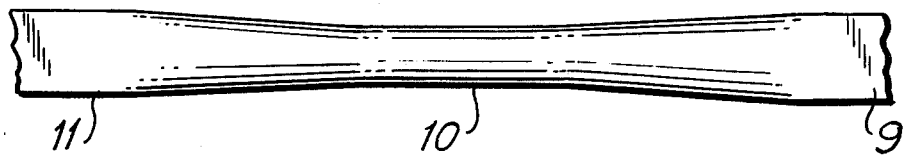
Figure 3:
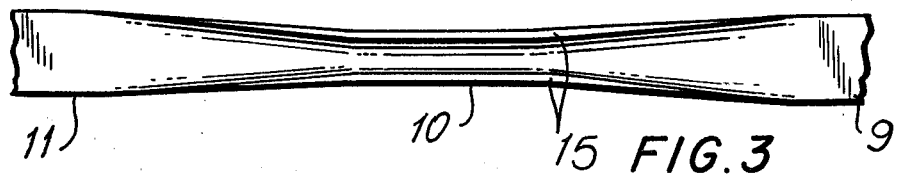
Figures 4, 5:
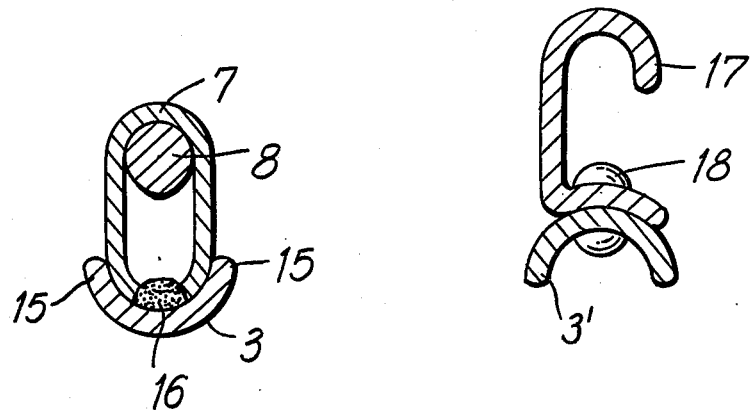

The present invention will now be described by way of example in detail in connection with the embodiments shown in the attached drawings, wherein FIG. 1 is a side elevational view of a grain lifter fastened to a mower guard finger, or the mower guard finger holder, FIG. 2 is a top view of the support leg in the section connected to the holder which embraces the mower guard finger tip with the channel portion open downwardly toward the ground, the holder having been omitted for the sake of clarity, FIG. 3 is a top view of the support leg in the section connected to the holder which embraces the mower guard finger tip with the channel portion open upwardly toward the top, the holder having been omitted for the sake of clarity, FIG. 4 is an enlarged section along the line 4—4 of FIG. 1 in the direction of the arrows with the channel portion open toward the top and the guard finger loop closed, this structure of FIG. 4 being shown at an enlarged scale, and FIG. 5 is a section similar to FIG. 4 with the channel portions open downwardly toward the ground and the holder which is open on one side riveted on it.

Grain lifter 1 shown in FIG. 1 is secured to mower guard finger 2 by having support leg 3 bolted, at its rear end, to mower guard finger 2 via mower finger fastening bolt 4 on mower cutter bar 5. Holder 7 is secured to support leg 3 and embraces mower guard finger tip 8 in such a way that the mower finger tip has a limited amount of play in the vertical direction within holder 7 so that support leg 3 can move upwardly.

Support leg 3 is subdivided into four sections. Rear section 9 is flat; the next following forwardly thereof section 10 is of a channel-shaped configuration, section 11, again, is flat, and front section 12 is provided with the a cross-section necessary for optimum gliding properties. To the front end of section 12, that is to the tip of support leg 3, there is secured stalk lifting bar 13 which slopes upwardly and rearwardly. In practical mowing work, section 12 glides in parallel over the ground and tip 14 of the grain lifter moves under the lying crop. The latter then glides over stalk lifter bar 13 and is thus lifted to prevent the grain from being cut during the harvesting operation. As the corn to be lifted may, under certain conditions, be very heavy, it is desirable that the stalk lifting bar can move downwardly. The rigid stalk lifting bar however does not permit this so that some resiliency should be provided in the support leg 3. For this reason, section 11 of the support leg is flat and free to yield resiliently since it is not stiffened by any other means. If the stalk lifting bar is overloaded, support leg 3 within section 11 will yield so much that tip 14 turns in a clockwise direction, as viewed in FIG. 1, relative to the remaining support leg.

If gliding section 12 moves over a raised portion of the ground, tip 14 of grain lifter 1 is also raised. According to the law of mechanics, the greatest force is transmitted to and resides in section 9 of the support leg considering particularly that guard finger tip 8 has play in the vertical direction within holder 7 and support leg 3 can be lifted and no forces will act on finger tip 8. In view of the fact however that support leg 3 is downwardly biased in order to provide the grain lifter with a firm seat on the mower finger, this bias will act contrary to the upward stroke of the grain lifter.

If in the prior art structures tip 14 is lifted, support leg 3 is resiliently bent within section 10.

This resilient property is a still greater disadvantage if under the rough field conditions tip 14 runs against a raised portion of the ground and is driven downwardly. As mower finger tip 8 locks holder 7 in the downward direction, support leg 3 will, with a flat section 10, bend down and will drive grain lifter tip 14 still further into the ground.

In contrast thereto and in accordance with the invention, section 10 is rendered rigid to such an extent that support leg 3 has almost no resilient properties within this section 10. When moving upwardly, the point of elasticity is wholly shifted to the rear section 9. As the attitude of the grain lifter will change substantially less relative to the cutter mechanism as compared to the case when the support leg can yield within section 10, the grain lifter possesses a better ground guidance. In addition, it can yield still less in the downward direction because holder 7 rests against the upper side of mower finger tip 8. The stiffness of section 10 also will not permit the grain lifter tip 14 to be driven into the ground because support leg 3 yields so much forwardly of rigid section 10 that tip 14 will yieldably turn in a counterclockwise direction relative to the ground, as viewed in FIG. 1, and will instead simply ride along the ground.

In FIG. 4 the advantages of an upwardly directed channel portion for the fastening of the guard finger loop are clearly shown. The lateral stresses of support leg 3 are transferred, by the upwardly bent channel sides 15, onto the correspondingly shaped guard finger loop 7 without stressing welding seam 16 from the side.

In FIG. 5, a channel portion open downwardly toward the ground within section 10 of support leg 3' is shown. This embodiment of the invention is of advantage if holder 17 is a prior art hook, which is open on the side and by the construction of which it is possible to mount the grain lifter without any auxiliary means on the mower guard finger. In the case of providing the support leg with a channel portion open on the top, difficulties are encountered when mounting, and it is for this reason that for this particular case a channel portion open toward the ground is preferred. As it is not possible, in view of the danger of breaking, that hook 17 constituting the holder can be welded on support leg 3', it is secured to support leg 3' with the aid of one or a plurality of rivets 18.

We claim:

1. For use with a harvester cutter mechanism which includes a mower guard finger having a front tip region and a mower guard finger holder, a grain lifter comprising an elongated support leg having a rear upper region secured to said holder, a front lower region adapted to glide along the ground, an elongated intermediate region inclined rearwardly and upwardly from said front lower region, and a fourth elongated region situated between said intermediate and rear regions, a holder fixed to and extending upwardly from said forth region of said support leg and embracing said front tip region of said mower guard finger, said fourth region of said support leg having a cross section which provides said fourth region with a rigidity sufficient to prevent yielding of said support leg at said fourth region thereof during operation of the harvester, while said rear upper region, front lower region, and elongated intermediate region of said support leg are made of a solid flat material which is springy and capable of yielding resiliently during operation of the harvester, said fourth region of said support leg being made of the same material as and being integral with the adjoining regions thereof but being transversely curved to have the configuration of an elongated channel of substantially U-shaped cross section to provide said fourth section with said rigidity.

2. For use with a harvester cutter mechanism which includes a mower guard finger having a front tip region and a mower guard finger holder, a grain lifter comprising an elongated support leg having a rear upper region secured to said holder, a front lower region adapted to glide along the ground, an elongated intermediate region inclined rearwardly and upwardly from said front lower region, and a fourth elongated region situated between said intermediate and rear regions, a holder fixed to and extending upwardly from said fourth region of said support leg and embracing said front tip region of said mower guard finger, said fourth region of said support leg having a cross section which provides said fourth region with a rigidity sufficient to prevent yielding of said support leg at said fourth region thereof during operation of the harvester, while said rear upper region, front lower region, and elongated intermediate regions of said support leg are made of solid flat material which is springy and capable of yielding resiliently during operation of the harvester, said support leg consisting of a single elongated body of solid sheet material which is substantially flat at all of said regions thereof except said fourth region, and said fourth region having the configuration of an elongated channel which provides said fourth region with said rigidity sufficient to prevent yielding of said support leg at said fourth region thereof.

3. The combination of claim 2 and wherein said fourth region of said support leg is in the form of an elongated channel portion which is open at its top.

4. The combination of claim 2 and wherein said fourth region of said support leg is in the form of an elongated channel portion which is open at its bottom.

5. The combination of claim 2 and wherein said fourth region of said support leg has a channel-shaped configuration which gradually merges forwardly into said intermediate portion of said support leg and terminates approximately midway between opposed ends of said support leg.

6. The combination of claim 2 and wherein said fourth region of said support leg has a channel-shaped configuration which gradually tapers and merges into the intermediate and rear regions where the latter are flat.

7. The combination of claim 1 and wherein said channel is open at the top, said holder which is fixed to and extends upwardly from said fourth section to embrace said front tip region of said mower guard finger being in the form of a closed loop which has a lower region situated in said channel and welded thereto by a single weld seam.

8. The combination of claim 1 and wherein said channel is open toward the bottom, and said holder which is fixed to and extends upwardly from said fourth region while embracing the front tip region of said mower guard finger being in the form of a hook having a lower region engaging an upper surface of said fourth region of said support leg and being riveted thereto.

* * * * *